No. 634,614. Patented Oct. 10, 1899.
J. DOYLE.
VEHICLE WHEEL.
(Application filed July 15, 1898.)
(No Model.)
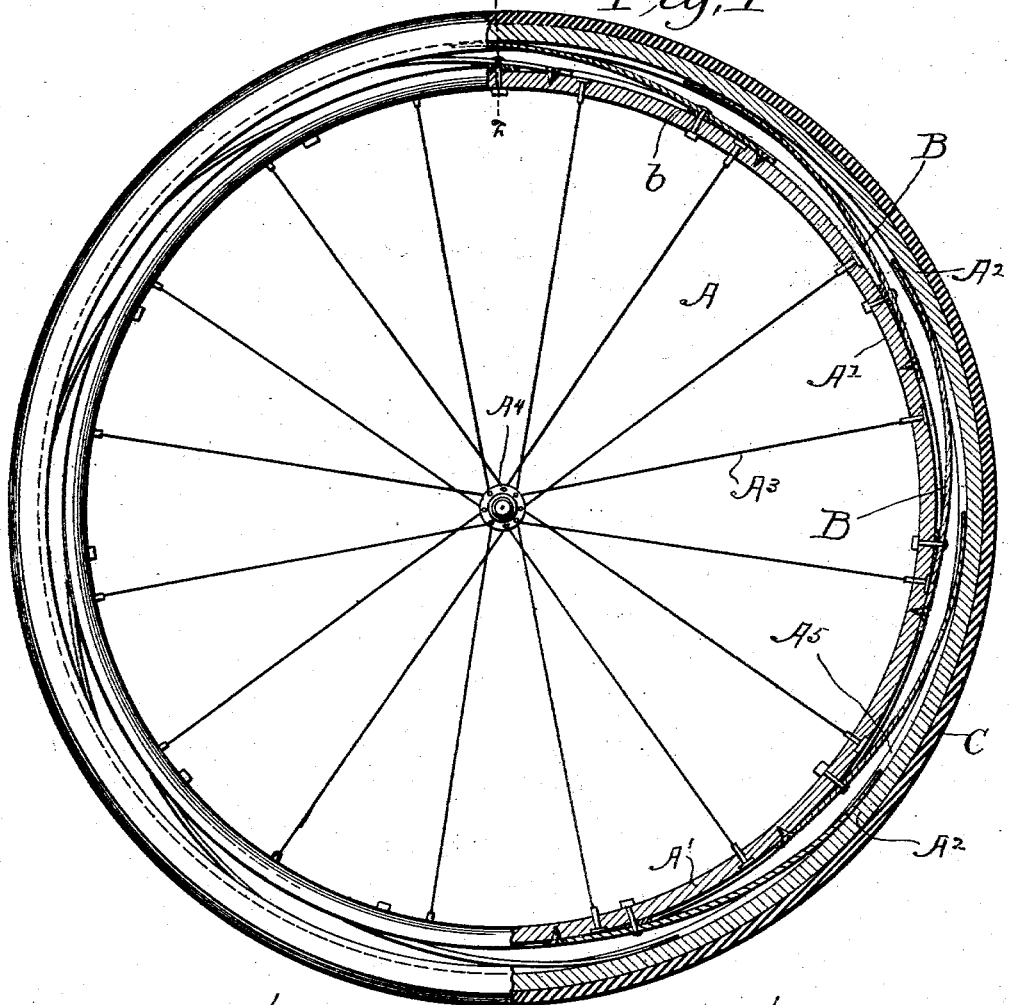
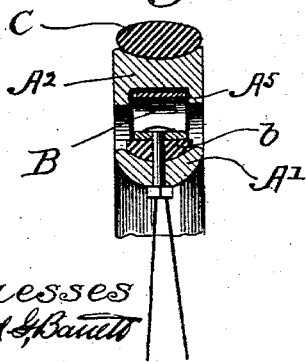
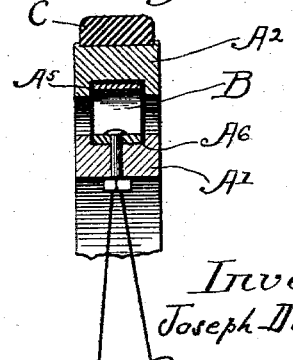
Witnesses
Harold G. Barrett
Wm. M. Rheem
Inventor
Joseph Doyle,
by Poole & Brown
his Atty's
THE NORRIS PETERS CO., PHOTO-LITHO., WASHINGTON, D. C.

UNITED STATES PATENT OFFICE.

JOSEPH DOYLE, OF CHICAGO, ILLINOIS.

VEHICLE-WHEEL.

SPECIFICATION forming part of Letters Patent No. 634,614, dated October 10, 1899.

Application filed July 15, 1898. Serial No. 686,052. (No model.)

*To all whom it may concern:*

Be it known that I, JOSEPH DOYLE, of Chicago, in the county of Cook and State of Illinois, have invented certain new and useful Improvements in Vehicle-Wheels; and I do hereby declare that the following is a full, clear, and exact description thereof, reference being had to the accompanying drawings, and to the letters of reference marked thereon, which form a part of this specification.

This invention relates to improvements in vehicle-wheels, and refers more specifically to an improved construction used in connection with the rim of a wheel which is designed to give resiliency to the wheel and prevent the shocks coming upon the same from being transmitted to the vehicle.

The invention consists in the matters hereinafter set forth, and more particularly pointed out in the appended claim.

In the drawings, Figure 1 is a view, partly in side elevation and partly in vertical section, of a vehicle-wheel constructed in accordance with my invention. Fig. 2 is an enlarged cross-section taken on line 2 2 of Fig. 1. Fig. 3 is a similar section of a slightly-modified form of my invention.

As shown in the drawings, A designates the wheel as a whole, comprising a circular rim $A'$, an outer concentric rim $A^2$, a plurality of springs B, interposed between said inner and outer rims, the usual spokes $A^3$, and a central hub $A^4$.

The rim shown in Figs. 1 and 2 is of that class commonly employed in connection with bicycles and other vehicles, which is provided in its outer circumferential wall with a circular groove of concave shape in cross-section and adapted to afford a seat for pneumatic or other tires of circular cross-section. This form of rim is shown in order to illustrate the application of my invention to the class of rims in most common use to which said invention may be readily applied.

The outer rim $A^2$ of the wheel, which corresponds to the usual tire, is made of greater internal diameter than the external diameter of the inner rim, thereby providing between the same an annular space of sufficient width to receive the springs B and permit the required movement of the inner rim with respect to the outer rim when said springs are brought under tension. Said springs B are made in the form of leaf-springs and are rigidly attached in any suitable manner at one end thereof to the outer peripheral surface of the inner rim by means providing a laterally rigid connection between the same. Said springs are secured in tangential relation to said inner rim and extend in the direction of the circumference of the inner rim, with their free ends in engagement with the inner surface of the outer rim, and serve to transmit the load of the vehicle from the inner to the outer rim. Said springs are herein shown as attached to the inner rim by means of screws, bolts, or the like, which in the forms shown in Figs. 1 and 2 pass through the same at two separated points in the length of the same to give the desired lateral rigidity thereto with respect to said inner rim. When the springs are used with a wheel-rim having a concave tire-seat therein, as shown in Figs. 1 and 2, filling-blocks $b$ will desirably be interposed between the same and the tire to bring the spring in proper relation to said rim. Obviously, however, such result might be secured by making the attached end of the spring of proper form. Said springs are of such length that the free end of each spring extends beyond the attached end of the next adjacent spring in the direction of its length. The springs will be substantially straight when attached to the inner rim, and when the outer rim is to be placed in position thereon the outer ends of the springs will be moved inwardly by any suitable clamping means until contained within a circular line of less diameter than the inner diameter of the outer rim. Said outer rim will then be located in position and the springs released into engagement with the inner surface thereof, the expansive force of said springs acting upon said outer rim to hold it in proper relation to said inner rim.

As a further improvement and in order to prevent the outer rim becoming detached from the wheel when the latter is under lateral strain said outer rim is provided with an inner circumferential groove $A^5$, adapted to receive the free ends of the springs. Said groove is located centrally between the side walls of said outer rim and is made of sufficient depth as to entirely receive the outer ends of the springs B. When said outer rim is in place and the outer ends of the springs seated within the groove $A^5$ and held therein by the elasticity of the springs, it will be obvious that the inner rim cannot be moved laterally out of its proper relation to the outer rim, as such lateral movement will be checked by the spring coming in contact with one of the side walls of the grooves $A^5$. Said springs B are rigidly attached to said inner rim in such manner as to resist ordinary lateral strains coming thereon, so that the presence of the groove $A^5$ in the outer rim insures that said inner and outer rims of the wheel will be retained in their proper relation at all times. Preferably the outer ends of said springs B will be made of tapering form, so as to be of less thickness at their outer or free ends than at their attached ends, this form of spring insuring the most desirable results. Said outer rim $A^2$ will be made of any suitable rigid material—such as wood, metal, paper-pulp, or the like—and will desirably be made of the same lateral width as the inner rim. Preferably the outer circumferential surface or tread of said outer rim will be provided with a yielding cover or tire C, of rubber or the like. The purpose of said tire C is to prevent the hard surface of the outer rim coming in contact with unyielding and resounding surfaces or roadways, and thereby render the action of the wheel on such surfaces or roadways noiseless. Said outer surface of the outer rim will desirably be provided with a concave or other shaped seat to receive said tire.

In Fig. 3 is shown a modification of the means of attaching the springs B to the inner rim in a manner to insure lateral rigidity between the same. As shown in said figure, the outer circumferential surface of the inner rim is made flat and provided with a plurality of suitably-shaped notches $A^6$, in which the attached ends of the springs are adapted to fit. Said notches are made of such lateral width that the springs fit closely therein and are of a depth to receive the full thickness of the spring. Said spring will be attached to the rim by one or more bolts, as in the construction previously described. In other respects the wheel is made substantially like that shown in Figs. 1 and 2 and heretofore described.

The main or principal feature of my invention is embodied in a wheel having inner and outer circumferential rims and provided with flat leaf-springs attached at one end thereof to the inner rim and adapted to engage at their outer ends a centrally-arranged groove or notch in the inner circumferential wall of the outer rim. By such construction the outer rim $A^2$ is held rigidly from lateral displacement when strain is brought thereon—as, for instance, when the vehicle is turned sharply around under a heavy load or when passing over uneven surfaces—and becomes in effect a permanent part of the wheel. The springs may be increased in number, if desired, and may be of less relative size than herein shown. Said springs will be made of such stiffness that when put under compression and the inner and outer rims moved together at the bottom of the wheel the springs located at the uppermost part of the wheel will not leave their seats.

I claim as my invention—

A vehicle-wheel comprising an inner rim, provided in its periphery with a plurality of circumferentially-arranged notches, an outer concentric rim having an inner circumferential groove, and a plurality of leaf-springs attached to said inner rim within said notches, and engaging at their free ends said groove of the outer rim.

In testimony that I claim the foregoing as my invention I affix my signature, in presence of two witnesses, this 11th day of July, A. D. 1898.

JOSEPH DOYLE.

Witnesses:
WILLIAM L. HALL,
CHARLES W. HILLS.